United States Patent Office 3,172,879
Patented Mar. 9, 1965

3,172,879
MODIFICATION OF NITRILE POLYMERS WITH A CARBOXYLIC ACID
Louis L. Ferstandig, El Cerrito, and William G. Toland, San Rafael, Calif., assignors to California Research Corporation, San Francisco, Calif., a corporation of Delaware
No Drawing. Filed Nov. 12, 1963, Ser. No. 323,048
6 Claims. (Cl. 260—88.7)

This invention relates to a process for modifying the physical characteristics of nitrile polymers, i.e., polymers containing free cyano substitutes, associated with the modification of the cyano radicals and/or a reduction in the nitrogen content of such polymers.

One of the principal characteristics of the conventional nitrile polymers and nitrile polymers as a class is their appreciable solubility in a number of highly polar organic solvents. While the solubilization of these polymers permits their adaptability to low temperature processing operations as in the molding, extrusion, and fiber-spinning fields, nevertheless, such advantage in processing is of no practical avail for the production of objects and material of construction which require solvent-resistance in practical application. In this respect, the use of nitrile polymers heretofore in such end use applications as fluid containers, filter cloth, protective clothing, etc., has involved serious limitations.

It has been found that nitrile polymers can be made very insoluble in even the strongest solvents by modifying the cyano substituents on the polymer by reacting the cyano groups with carboxyl groups, and this reaction is accompanied by a reduction of the nitrogen content of the polymer. This modification can be accomplished by reacting the polymer with a carboxylic acid as described hereinafter. Furthermore, it has been found that even when the polymer is treated in the form of solid fibers where one would expect that many of the cyano substituents on the polymer would be unavailable for the reaction, the reaction may be controlled to produce skin modification of the polymer or high and controllable degrees of polymer modification and/or nitrogen removal throughout the mass of the polymer. Thus, it is possible to utilize in such operations as fiber spinning the fact that nitrile polymers are soluble in special solvents and then, in accordance with this invention, reduce that solubility so that the final polymer products obtained possess very high solvent resistance. By the practice of this invention, the processing of the polymer may include operations where the polymer must be dissolved, yet the final polymer produced may be very resistant to solvents.

The process of this invention is carried out by reacting a nitrile polymer or a polymer containing free cyano substituents with a carboxylic acid at a temperature within the range of 180° C. to 300° C. The reaction can be carried out for varying periods of time, longer periods of reaction resulting in greater modification of the polymer.

Substantially all polymers which contain cyano substituents can be modified in accordance with this process. The process is particularly useful for modifying the polymers derived from acrylonitrile. Pure polyacrylonitrile may be modified in accordance with this process as may polyacrylonitrile copolymers derived from acrylonitrile and any of the vinyl compounds with which acrylonitrile can be copolymerized.

The polyacronitrile polymers are known as acrylic polymers, that is, they contain at least 85 mole percent of acrylonitrile monomers. The acrylonitrile polymers which find use in commerce will usually have from about 1 to 15 mole percent of monomers other than acrylonitrile. These monomers are introduced to enhance particular properties of the polymer, e.g., dyeability. Illustrative monomers which find use are vinyl chloride, vinyl pyridine, vinyl acetate, styrene, ethyl acrylate, acrylamides, and n-substituted acrylamides, chloracrylic acid and chloracrylic acid derivatives, isopropenyl acetate, para-N,N-dimethylamino styrene, vinylidene chloride, vinyl chloracetate, vinyl-1-imidazole, etc.

The preferred general classes of addition polymerizable olefins which find use are ones having the amino-functional group, the amide-functional group, the halo-functional group, and an ester-functional group.

The carboxylic acid used in the process may be any carboxylic acid, either aliphatic, alicyclic or aromatic; and mono and polycarboxylic acids are equally operable. The carboxylic acid may be substituted or unsubstituted provided the substituent radicals are not in and of themselves reactive with the components of the polymer under the conditions of the primary reaction. While it is possible to effect the modifying reaction with the carboxylic acid in the solid state, it is desirable that the carboxylic acid used in the process be in a fluid condition at the temperature of the reaction; the fluid condition may be obtained by melting or vaporizing the acid or by dissolving the acid in a suitable solvent.

The modification reaction results in removal of nitrogen from the polymer and the production of the nitrile which corresponds to the carboxylic acid charged. Where the nitrile thus produced has a boiling point below the reaction temperature, the nitrile will be removed during the reaction. Where the nitrile thus produced has a boiling point above the reaction temperature, the nitrile may remain associated with the polymer though the physical properties of the polymer will be modified and nitrogen removed from the polymer.

The modification reaction may be conducted on nitrile polymers at any temperature above about 180° C. and below the decomposition temperature of the polymer and the carboxylic acid at the pressure employed. The reaction will take place at temperatures within the range of 180–220° C., but it has been found that at temperatures of 220° C. and above the reaction progresses much more rapidly than it does below 220° C. Since many of the nitrile polymers decompose at elevated temperatures, it is desirable to conduct the reaction at a temperature below about 300° C. and preferably bellow about 250° C. Accordingly, it is most desirable to operate the process at temperatures within the range of 220–250° C. The process may be conducted at atmospheric, subatmospheric or superatmospheric pressure.

The reaction time necessary to effect the desired modification of the polymer will vary substantially, depending upon the physical state of the polymer and the temperature at which the reaction is conducted. In some cases it may be desirable to maintain the polymer in contact with the carboxylic acid at elevated temperatures for very long periods of time, that is, substantially in excess of an hour. In other cases, however, the desired degree of polymer modification can be effected in very short times, i.e., in a fraction of a minute. In substantially all cases, however, it is desirable to conduct the reaction on the polymer for a sufficient time that the nitrogen content in the affected portion of the polymer is reduced by at least about 5 percent. Even where the affected portion of the polymer is only the skin of the polymer, the nitrogen content in the skin will be reduced at least 5 percent before the physical properties of the polymer are appreciably changed. Longer reaction times and/or higher temperatures may be employed to produce any greater polymer modification desired.

The modified polymers produced in accordance with this process possess many desirable properties. Polymers which are normally soluble in many solvents can be made very insoluble in those solvents by this process, and nitrile polymers which are normally not thermosetting can be thermoset in the presence of carboxylic acids. Thus, a fabric made of a nitrile polymer may have creases thermoset therein by treatment by this process while they are creased.

Nitrile polymers may be provided with a modified skin in accordance with the invention, and the films and fibers made of nitrile polymers can be modified throughout their masses by this process. Solid blocks of polymers modified throughout their masses can also be prepared by modifying the polymer in a liquid or high surface area solid form and subsequently fabricating solid objects from the modified polymer. The modification reaction may actually be accomplished in a molding press.

The modified polymers produced in accordance with this process possess improved properties in addition to solvent resistance. For instance, the modified polymers may be dyed more readily than the unmodified polymers, and the modified polymers are more resistant to burning than unmodified polymers; a polyacrylonitrile fiber, modified by this process, barely supports combustion while the unmodified fiber burns vigorously.

The process of this invention may be understood in more detail by reference to the following illustrative examples:

Examples 1–7

In each of a series of runs, about 3 grams of a polyacrylonitrile fiber, Du Pont Type 42 Orlon semidull 3.0 denier staple, was placed in a preheated sample of about 400 grams of benzoic acid. The mixture was maintained at a specified temperature for a specified time after which the fiber was withdrawn from the acid. The fiber was washed with ether to remove excess benzoic acid and dried.

A 2-gram portion of the treated polymer was heated with 25 milliliters of N,N-dimethylformamide at 100° C. for two days after which time the mixture was cooled and centrifuged. The solid collected was washed briefly with fresh N,N-dimethylformamide and then washed with ether. The remaining solid was dried and weighed, and the percent insolubility was taken as the final weight of the sample divided by the initial weight times 100. A second portion of the treated polymer was analyzed for nitrogen content. The results of this series of runs are tabulated below wherein Examples 1 through 6 were conducted as described above. In Example 7, benzoic acid was replaced by white oil in order to obtain comparative data on the effect of heat on the polymer in the absence of the carboxylic acid.

| Example No. | Temp., °C. | Time in Min. | Percent Insoluble | Percent N |
|---|---|---|---|---|
| 1 | 200 | 5 | 0.5 | |
| 2 | 200 | 15 | 1.7 | |
| 3 | 220 | 5 | 35 | 20.3, 21.2 |
| 4 | 230 | 5 | 60 | 16.9, 18.0 |
| 5 | 249 | 15 | 94 | |
| 6 | 249 | 60 | 98 | 12.0, 12.2 |
| 7 | 220 | 5 | 0 | 23.9, 24.6 |

The polymer's nitrogen content and solubility were unaffected in Example 7 by the action of heat alone, whereas in Example 3, conducted in benzoic acid at the same temperature and for the same period of time, the nitrogen content of the polymer was reduced by approximately 15 percent, and the percent insolubility was 35 percent. Examples 4 and 5, conducted at higher temperatures and longer periods of time, show greater changes in nitrogen content and solubility of the polymer. Examples 1 and 2, conducted at lower temperatures, illustrate the fact that conditions can be chosen for the process to effect very small selective changes in the polymer.

Example 6, where the polymer was treated at 249° C. for one hour, illustrates the fact that the total nitrogen content of the polymer need not be removed to effect solvent resistance. The nitrogen content of the treated polymer was approximately one half that of the original polymer, whereas polymer solubility was reduced almost to zero.

In addition to the measurement of the above data in Example 6, the effluent gases from the reaction vessel was condensed and added to the liquor removed from the centrifuge and analyzed for benzonitrile content, and the benzonitrile thus recovered accounted for 26 percent of the nitrogen content of the original polymer.

The following example illustrates a suitable procedure for practicing the invention with the carboxylic acid in the vapor phase.

Example 8

A sample of the above-identified polyacrylonitrile fiber was suspended in a heated glass tube through which a stream of gas could be passed. Acetic acid and nitrogen were passed through the tube at a rate of about 10 grams of acetic acid per hour. The temperature of the tube was maintained at 220° C. and the vapors leaving the tube were condensed and analyzed for acetonitrile content. It was found that 0.1 gram of acetonitrile was formed per hour under these conditions.

This application is a continuation-in-part of our co-pending application Serial No. 799,109, filed March 13, 1959, now abandoned.

We claim:

1. A method of modifying the physical properties of polyacrylonitrile homopolymer, which comprises reacting said homopolymer with an unsubstituted carboxylic acid selected from the class consisting of aliphatic, alicyclic and aromatic carboxylic acids at a temperature within the range of about 180 to 300° C. for a period of time sufficient to reduce the nitrogen content of said homopolymer by at least 5% of its original nitrogen content, with at least part of the nitrogen removed from said homopolymer combining with said carboxylic acid with formation of the nitrile of said carboxylic acid.

2. A method according to claim 1 wherein said carboxylic acid is a fluid.

3. A method according to claim 2 wherein the temperature is in the range of about 220 to 250° C.

4. A method according to claim 3 in which said carboxylic acid is benzoic acid.

5. A method according to claim 3 in which said carboxylic acid is acetic acid.

6. A method of modifying the physical properties of polyacrylonitrile having at least 85 mole percent of acrylonitrile monomers, which comprises reacting said polyacrylonitrile with an unsubstituted carboxylic acid selected from the class consisting of aliphatic, alicyclic and aromatic carboxylic acids at a temperature within the range of about 180 to 300° C. for a period of time sufficient to reduce the nitrogen content of said polyacrylonitrile by at least 5% of its original nitrogen content, with at least part of the nitrogen removed from said polyacrylonitrile combining with said carboxylic acid with formation of the nitrile of said carboxylic acid.

No references cited.